United States Patent [19]

Pellizzari et al.

[11] Patent Number: 4,853,697

[45] Date of Patent: Aug. 1, 1989

[54] KEYBOARD WITH MANUAL-CONTROL KEYS COMBINED WITH A DISPLAY SYSTEM

[75] Inventors: Paolo Pellizzari, Amherst; Richard Perry, Milford, both of N.H.

[73] Assignee: Kiel Corporation, Nashua, N.H.

[21] Appl. No.: 80,536

[22] PCT Filed: Nov. 19, 1985

[86] PCT No.: PCT/FR85/00324

§ 371 Date: Jul. 6, 1987

§ 102(e) Date: Jul. 6, 1987

[87] PCT Pub. No.: WO87/03113

PCT Pub. Date: May 21, 1987

[51] Int. Cl.[4] .................. H03M 11/00; H03K 17/969
[52] U.S. Cl. ....................................... 341/23; 341/22; 341/27; 341/34; 340/711
[58] Field of Search ............... 340/365 VL, 712, 711, 340/407; 341/22, 23, 27, 33, 34

[56] References Cited

U.S. PATENT DOCUMENTS

| | | |
|---|---|---|
| 4,224,615 | 9/1980 | Penz . |
| 4,646,062 | 2/1987 | Arakawa .................. 340/365 VL |
| 4,740,781 | 4/1988 | Brown .......................... 340/712 |
| 4,746,919 | 5/1988 | Reitmeier ..................... 340/712 |

FOREIGN PATENT DOCUMENTS

| | | |
|---|---|---|
| 2181288 | 11/1973 | France . |
| 2532085 | 2/1984 | France . |
| 2125199 | 2/1984 | United Kingdom . |

OTHER PUBLICATIONS

"Liquid Crystal Display and Touch Panel Keyboard Input"; Harris et al.; IBM Tech. Discl. Bulletin; vol. 24, No. 4, Sep. 1981.
Proceedings of the IEEE 1982 National Aerospace Electronics Conference NAECON 1982.
Patent Abstracts of Japan, vol. 8, No. 101, 5/12/84.

Primary Examiner—Donald J. Yusko
Assistant Examiner—Tyrone Queen
Attorney, Agent, or Firm—Fleit, Jacobson, Cohn, Price, Holman & Stern

[57] ABSTRACT

A keyboard having a series of parallel bars capable of mechanical displacement by downward thrust under the pressure of the user's fingers, and a luminous display system in which a tactile electric control screen forms the top of the bars. Circuits are used for producing control orders from at least bar data and key data, with the bar data being selected according to the bars depressed. Specific key functions are assigned electronically to screen zones disposed at intervals along each bar, and a controller provides the display system with a visual representation related to each key function in the corresponding screen zone.

15 Claims, 2 Drawing Sheets

KEYBOARD WITH MANUAL-CONTROL KEYS COMBINED WITH A DISPLAY SYSTEM

CROSS REFERENCE TO RELATED APPLICATION(S)

This U.S. application stems from PCT International Application No. PCT/FR85/00324 filed Nov. 19, 1985.

The invention relates to the design concept and the construction of keyboards, it being understood that this term includes all types of keyboards which are intended to be employed for manual control of a wide range of different machines; the keyboards of office machines, especially those of typewriters or computer peripherals are examples of keyboards which are particularly representative but in no way limitative.

In this field, the invention mainly proposes to combine in one and the same device two different modes of operation, namely that of mechanical keys of conventional keyboards and that of tactile screens permitting finger-touch control, thereby extending the possibilities of application of keyboards by increasing their flexibility of operation. One of the results of the invention is in fact to preserve the mechanical reaction of the keys to which the user of conventional keyboards is accustomed and nevertheless to utilize the performances of microprocessors for permitting redefinition of the keyboard from one use to another and even permitting visual dialog with the user.

The keyboard in accordance with the invention is a keyboard having manual control keys combined with a display system, essentially characterized in that it comprises a series of parallel bars capable of mechanical displacement by downward thrust under the pressure of the user's fingers, a luminous display system in which a tactile electric control screen forms the top of said bars, circuits for producing control orders from at least bar data and key data, said bar data being selected according to the bars depressed, electronic means for assigning specific key functions to screen zones disposed at intervals along each bar or at least a certain number of bars, means for controlling through said display system a visual representation related to each key function in the corresponding screen zone, locating means for detecting a key selected according to the position of contact of the fingers which press a bar on said screen zones, and means for producing said key data as a function of the key selected and of the corresponding key function.

Preferably, the keyboard is provided with means for controlling the display system by the locating means as a function of the key selected. The locating means can advantageously comprise means for determining a Y-coordinate of the key selected according to the bar depressed, and an X-coordinate of said key selected according to the screen zone contacted.

In fact, in regard to the design concept of the locating means in conjunction with that of the tactile screen and with the utilization of the key data, reference may be made to the descriptions which have been given in French patent Applications No. 83 20480 of 21st December 1983 and No. 83 19466 of 9th December 1983 filed in the name of Paolo Pellizzari. However, although the particular embodiments which form the subject of these patents can be applied by way of preference, they are in no way imperatively necessary for the practical application of the present invention. There exist other forms of construction, more widely known and industrially available, which also make it possible as required by the keyboard of the invention to control the luminous display on a screen, to detect the position of the user's finger on this screen, and to determine the control operation as a function of the position detected. It will thus be possible to make use of tactile screen systems which operate by capacitive effect, for example.

In a particularly advantageous manner, each movable bar comprises in a rigid assembly a transparent top plate provided with electric locating circuits designed to detect among a number of keys reserved on the same bar the particular key which is contacted at the time of actuation of the bar, and a visual display device placed beneath said plate.

The support for the assembly can advantageously comprise preliminary processing circuits such as multiplexing and demultiplexing circuits associated on the one hand with the detection circuits of the plate and on the other hand with the control circuits of the visual display device.

There will now be described in greater detail a particular form of embodiment of the invention which will permit a clearer understanding of the essential characteristics and advantages thereof, it being understood, however, that this form of embodiment is chosen by way of example and that it is not given in any sense by way of limitation. This description is illustrated in the accompanying drawings, in which.

Figure 1:
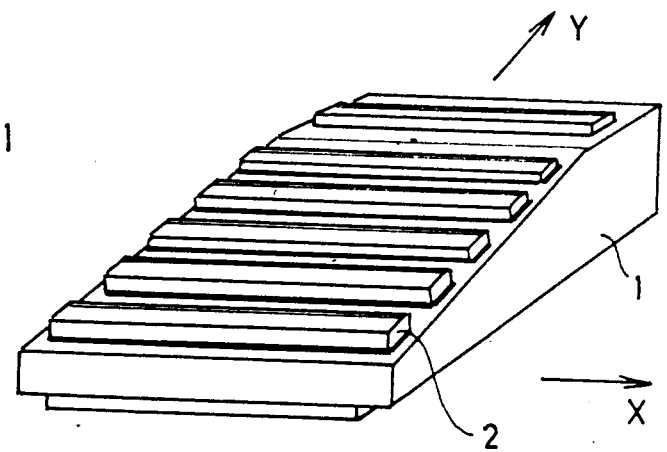
FIG. 1 is a schematic illustration of the keyboard of the example described, looking from the exterior.
Figure 2:
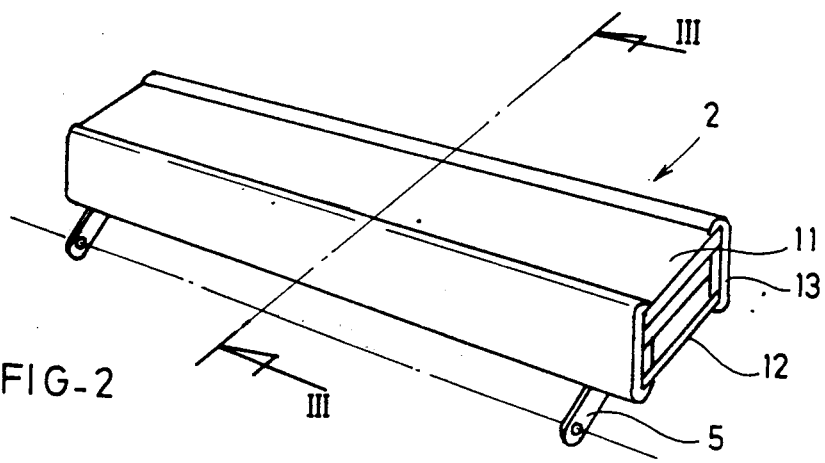
FIG. 2 illustrates a bar which is assumed to have been removed from this keyboard.

In accordance with FIG. 1, the keyboard in accordance with the invention, among its elements which are visible from the exterior, comprises a series of parallel bars 2 on a frame 1 which, by way of example, can be constructed in the same manner as that of a typewriter. In the arrangement which is suitable for use, the bars 2 are horizontal, oriented from left to right and succeed each other in the direction Y.

Figure 3:
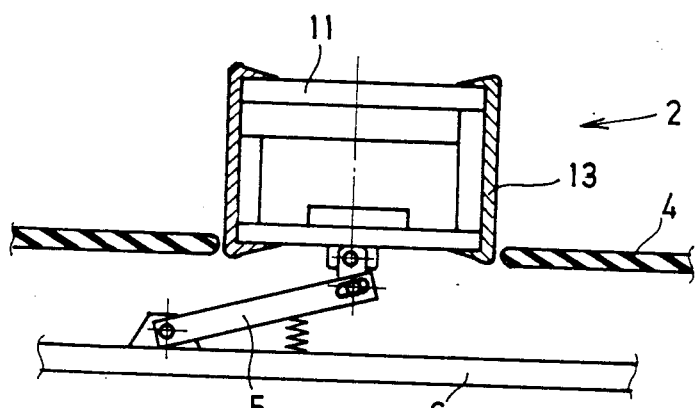
FIG. 3 is a schematic transverse sectional view of the keyboard, illustrating the mechanical portion of the characteristics of the invention.

On the keyboard, the bars 2 operate in the same manner as the keys of a mechanical keyboard: they move vertically downwards under the pressure of the user's fingers. To this end, they are movably mounted through the cover 4 of the frame (FIG. 3) by means of a system of levers 5 for connecting them at both ends to a stationary support 6 within the frame.

Provision is also made on the support 6 for the electronic circuits 7 which produce the control orders including those transmitted to the external equipment units which the keyboard serves to control. These may consist in particular of a printer, a video monitor, a magnetic data-recording unit, etc. which operate via the central unit of a computer system in which the keyboard of the invention constitutes a peripheral equipment unit.

A device for establishing an electric contact between studs 8 and 9 fixed respectively beneath each bar 2 and on the support 6 makes it possible to detect the downward displacement of the bar and to transmit corresponding bar data to the electronic circuits. These data represent the depressed or non-depressed state in a manner which is specific to each bar, thus characterizing the Y-coordinate along the bar which is actuated by the user. Should the effective displacement of the bars be considered as insufficient in their mechanical reaction, the circuits are capable of emitting a sound which recalls the clicking sound of keys of a conventional keyboard which is solely mechanical.

On the other hand, the inertia of these latter is far from being again present in the bars of the keyboard of the invention, which are on the contrary so designed as to be capable of constituting in each case a plurality of control keys disposed at intervals along the X-axis. This is obtained by means of a tactile-screen luminous display system, one example of construction of which will be described hereinafter although it will be understood that it can be of any other type. It is desirable to ensure, however, that a system of this type remains of small overall size as is the case with the capacitive-effect control screens which are now known to the public or the electrically-conductive transparent-plate system which has been described in French patent Application No. 83 20480 filed on 21st December 1983 in the name of Paolo Pellizzari under the title "Table for presentation of graphic information".

Figure 4:
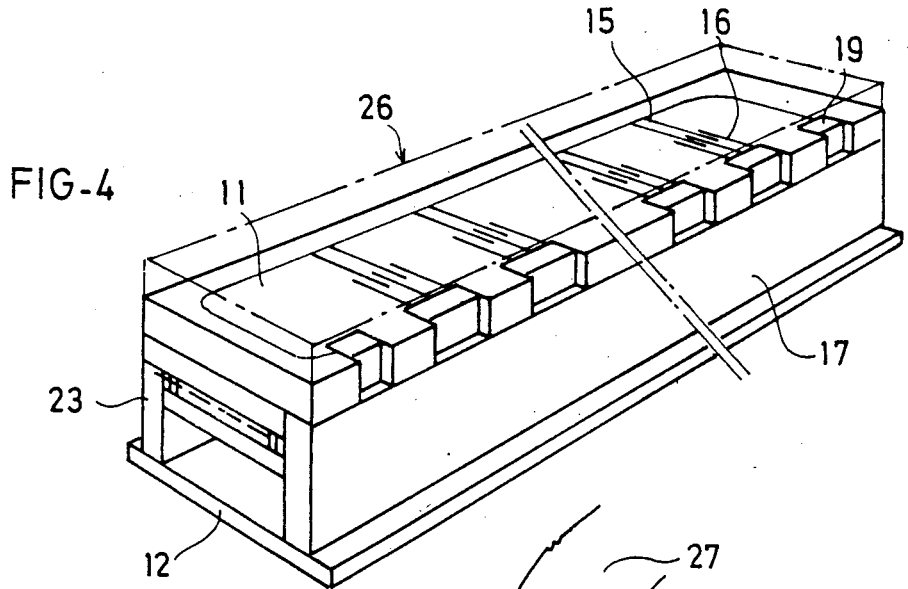
FIG. 4 is a perspective view of a bar showing the top of the screen.
Figure 5:
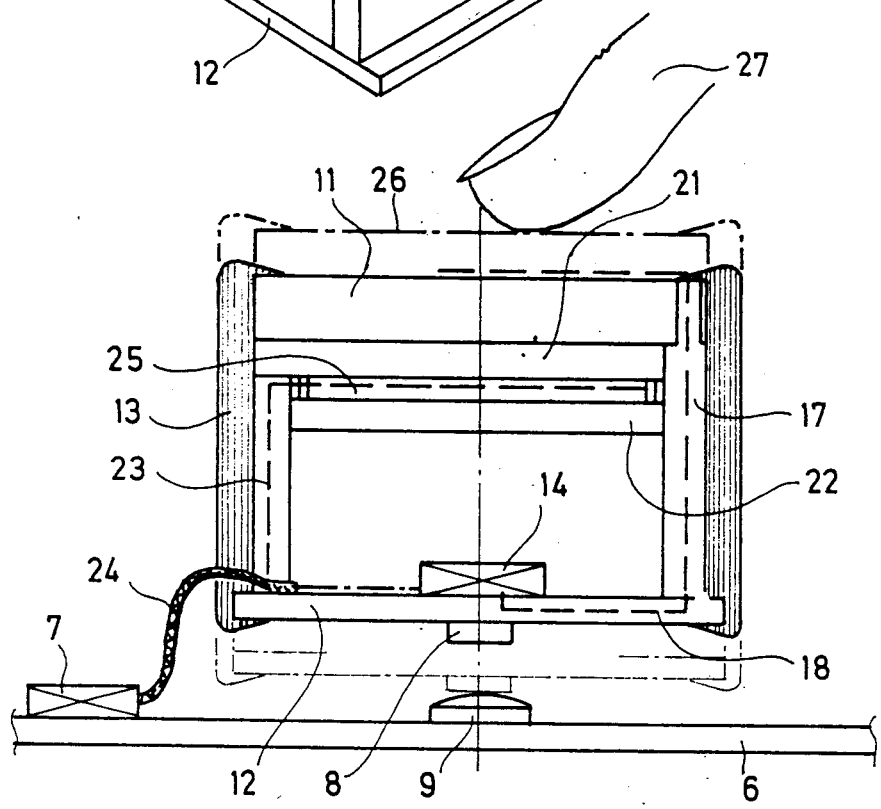
FIG. 5 is another transverse sectional view of a bar, which illustrates expecially the electronic portion of the characteristics of the invention.

In accordance with FIGS. 4 and 5 in particular, each bar except for the spacer bar of an alphabetical or alphanumeric keyboard is provided at the top with a transparent detection plate 11 and underneath with a base plate 12, these two plates being framed and connected together by means of two lateral cheek-plates 13. The visual display device which determines the luminous display is formed beneath the top plate 11. It is of the liquid-crystal type, for example. The bar finally contains part of the electronic signal-processing circuits in the form of a printed circuit which is fixed on the base plate 12 at 14. These circuits comprise in particular multiplexing circuits and demultiplexing circuits which process on the one hand the data relating to location of the key contacted by the user and derived from the detection function of the plate 11 and on the other hand the display control orders produced by the external circuits and transmitted to the visual display device.

It is seen in particular in FIG. 4 that the plate 11 carries on its top face two series of conductors in parallel. Those of the first series 15 and those of the second series 16 come into proximity with each other in the axis of the bar at locations which are uniformly spaced along this latter and represent a corresponding number of detection and location points which are sensitive to contact of the user's finger which ensures electrical conduction between the conductors of the two series. However, in accordance with a preferred embodiment of the invention, the detection and location points on the bar are no longer sensitive to direct contact of a user's finger on the glass of the top face but to a capacitive effect of a top tactile screen.

This tactile-screen device which operates by capacitive effect has the advantage of avoiding oxidation of the electric conductors 15, 16 which results from frequent contact of the finger on these conductors.

The device in a design of this type comprises a tactile screen 26 which operates by capacitive effect and is placed on the top portion of the bar. When the user's finger 27 presses lightly on this tactile screen 26, the downward displacement of this screen entails a variation in capacitance which permits detection and location of the key.

The signals obtained therefore represent the X-axis position of the key contacted on the bar which has been actuated. The information is transmitted to the circuits 14 by means of a conductive strip 17 interposed between the plates 11 and 12 along one side of the bar. This strip is selectively conductive in the vertical direction from one plate to the other and thus ensures a connectin between the conductors of the plate 11 and conductive deposits 18 formed on the base plate 12, by means of conductive deposits 19 formed in recesses arranged on one side of the plate 11, those located at the end of the bar being reserved for the first series of conductors 15, the others for the second series of conductors 16. This design as a whole maintains the transparency of the plate 11 which is necessary for the display function.

The liquid crystals of the visual display device are placed between two glass plates 21 and 22, at least the top plate being intended to be transparent. These plates carry the conductive deposits which control the luminous display at the points of concurrence between the conductors of two series which are selected by the display control orders. The electrical connection between the visual display device and the circuits 14 is established through the intermediary of conductors deposited on the plate 18 by means of a strip 23, of the same type as the strip 17, placed on the other side of the bar.

A cable 24 or a flexible conductor of any known type provides the useful connections with the external electronic circuits 7. The design of these latter as in the case of the design of the multiplexing and demultiplexing circuits 14 is within the capacity of any person versed in the art provided that such a person has a knowledge of the functions to be performed. It is necessary among other things to assign specific functions to the screen zones defined along each bar, the zones being defined in conjunction with the system for locating and detecting a contact but for functions having a definition which can be varied at will, to produce key data as a function not only of the key selected at the time of contact but also of the corresponding key function, to control by means of the display system a visual representation which is related to each key function in the corresponding screen zone. The display system thus supplies items of information which are highly useful for the keyboard user by causing the appearance beneath his fingers, for example, of a symbolical representation of the function assigned to the individual keys in respect to a predetermined operation by visualizing an instruction order or by indicating whether a function, and which function, has been actuated.

The invention is naturally not limited in any respect to the particular features which have been specified in the foregoing or to the details of the particular embodiment chosen for illustrating the invention. All kinds of variants can be added to the particular construction which has been described by way of example and to its constituent elements without thereby departing from the scope of the invention. This latter thus includes all the means constituting technical equivalents of the means described as well as their combinations.

We claim:

1. A keyboard having manual control keys combined with a display system, comprising:

a series of parallel bars capable of mechanical displacement by a downward thrust under the pressure of a user's fingers, a luminous display system in which a tactile electric control screen forms the top of said bars, circuits for producing control orders from at least bar data and key data, said bar data being selected according to the parallel bars depressed, electronic means for assigning specific key functions to screen zones of a certain number of the parallel bars said screen zones being disposed at intervals along said bars, means for controlling through said display system a visual representation related to each key function in the corresponding screen zone, locating means for detecting a key selected according to the position of contact of the fingers which press a bar on said screen zones, and means for producing said key data as a function of the key selected and of the corresponding key function.

2. A keyboard in accordance with claim 1, further comprising means for controlling the display system through the locating means as a function of the key selected.

3. A keyboard in accordance with claim 2, wherein the locating means comprise means for determining a Y-coordinate of the key selected according to the bar depressed, and an x-coordinate of said key selected according to the screen zone contacted.

4. A keyboard in accordance with claim 3, characterized in that each movable bar comprises in a rigid assembly a transparent top tactile plate designed to detect by capacitive effect among a number of keys reserved on the same bar the particular key which is contacted at the time of actuation of the bar, and a visual display device placed beneath said plate.

5. A keyboard in accordance with claim 3, characterized in that each movable bar comprises in a rigid assembly a transparent top plate provided with said locating means serving as electric locating circuits designed to detect among a number of keys reserved on the same bar the particular key which is contacted at the time of actuation of the bar, and a visual display device placed beneath said plate.

6. A keyboard in accordance with claim 4 or 5, characterized in that each bar comprises preliminary processing circuits associated with said locating means and with the control circuits of the visual display device.

7. A keyboard in accordance with claim 6, characterized in that on a certain number of said bars a transparent top plate carries conductors for detection and location of a contact of the user's finger on a screen zone of the bar which defines the key selected on the corresponding bar, a visual display device of liquid crystal type, and lateral strips for providing a unidirectional electrical connection between conductors formed on the base plate and on the top plate and on the visual display device.

8. A keyboard, comprising:
a frame having an upper surface perforated by a plurality of slots;

an array of parallel bars having tops, said parallel bars being disposed within respective ones of said slots and extending above said upper surface, each of said parallel bars being capable of mechanical displacement independently of said upper surface by a downward thrust under the pressure of user's fingers to provide bar data;

circuit means for assigning specific key functions to screen zones of a certain number of the parallel bars, said screen zones being disposed at intervals along said tops, and for producing control orders from said bar data and key data;

a plurality of locating means disposed in corresponding ones of said screen zones along the lengths of each of said tops, for detecting keys selected according to the position of contact of the user's fingers and providing key data;

a luminous display system disposed beneath said top of said bars; and means for controlling through said display system, visual representations in said screen zones relating to corresponding said key functions.

9. A keyboard according to claim 8, further comprising means for controlling the display system through the locating means as a function of the key selected.

10. A keyboard in accordance with claim 9, wherein the locating means comprise means for determining a Y-coordinate of the key selected according to the bar depressed, and an X-coordinate of said key selected according to the screen zone contacted.

11. A keyboard according to claim 10, wherein each movable bar comprises a rigid assembly having a transparent top tactile plate designed to detect by capacitive effect among a number of keys reserved on the same bar the particular key which is contacted at the time of actuation of the bar, and a visual display device placed beneath said plate.

12. A keyboard according to claim 10, wherein each movable bar comprises a rigid assembly including a transparent top plate provided with said locating means disposed to detect among a number of keys reserved on the same bar the particular key contact at the time of actuation of the bar, and said luminous display system placed beneath said top plate.

13. A keyboard according to claim 11 or 12, wherein each bar comprises preliminary processing circuits associated with the locating means, the circuit means and the luminous display system.

14. A keyboard according to claim 13, wherein some of said bars have a transparent top plate carrying conductors defining screen zones for detection and location of a contact of the user's finger on the bars, a visual display device, and lateral strips for providing an electrical connection between conductors formed on the base plate, conductors of the top plate and the luminous display system.

15. A keyboard, comprising:
a frame providing an upper surface;

a series of parallel bars set within the keyboard frame and capable of mechanical displacement relative to the upper surface by a downward thrust under the pressure of a user's finger;

means for detecting mechanical displacement of said parallel bars;

means disposed along the lengths of each of said bars and defining distinct key zones, for detecting said pressure of a user's fingers within any of said key zones;

some of said parallel bars including a luminous display system providing visual representations related to key functions for each of said key zones;

circuits for producing control signals from bar data resulting from detection of said mechanical displacement and key data resulting from detection of said keys selected; and means for controlling through said display system, visual representations in said key zones relating to said key functions.

* * * * *